United States Patent [19]

Ogawa et al.

[11] Patent Number: 5,002,707
[45] Date of Patent: Mar. 26, 1991

[54] METHOD FOR PRODUCING SUPERLONG CONJUGATED DIACETYLENE POLYMER

[75] Inventors: Kazufumi Ogawa, Hirakata; Hideharu Tamura, Katano, both of Japan

[73] Assignee: Matsushita Electric Industrial Co., Ltd., Osaka, Japan

[21] Appl. No.: 216,524

[22] Filed: Jul. 7, 1988

[30] Foreign Application Priority Data

Jul. 15, 1987 [JP] Japan .................. 62-176180

[51] Int. Cl.[5] ............................. B29D 7/01
[52] U.S. Cl. .................... 264/22; 264/104;
264/298; 522/3; 522/182; 526/285
[58] Field of Search .......... 264/22, 298, 104;
526/285; 204/164; 522/3, 182

[56] References Cited

U.S. PATENT DOCUMENTS

| 4,439,514 | 3/1984 | Garito ............ 430/270 |
| 4,536,450 | 8/1985 | Garito ............ 430/270 |
| 4,564,492 | 1/1986 | Bott et al. ...... 264/104 |
| 4,798,740 | 1/1989 | Tomida .......... 430/281 |

OTHER PUBLICATIONS

Journal of Polymer Science: Polymer Letters Edition, vol. 16, 1978, John Wiley & Sons Inc., New York, D. Day et al. "Polymerization of Diacetylene Carbonic Acid Monolayers at the Gas-Water Interface", pp. 205-210 * Totality *.

Journal of Macromolecular Science-Chemistry, vol. A15, No. 5, 1981, Marcel Dekker Inc., New York, H. H. Hub et al. "Polymerization of Lipid and Lysolipid Like Diacetylenes in Monolayers and Liposomes", pp. 701-715 * Totality *.

Journal of the American Chemical Society, vol. 104, No. 1, 1982, American Chemical Society, Washington, D.C., E. Lopez et al., "Structural Effects on the Photopolymerization of Bilayer Membranes", pp. 305-307 * Totality *.

Primary Examiner—James Lowe
Attorney, Agent, or Firm—Wenderoth, Lind & Ponack

[57] ABSTRACT

Disclosed in a method for producing polydiacetylene of superhigh molecular weight (i.e., a superlong conjugated polymer) having continuous conjugated bands and a straight chain by spreading an organic solvent containing diacetylene derivative on a water surface, gathering up by a barrier, and photopolymerizing the derivative while compressing at a constant surface pressure. Also disclosed is a method for producing polydiacetylene comprising the step of improving the arrangement by applying a direct-current field in a specified direction at the time of spreading and collecting the diacetylene derivative molecules.

4 Claims, 20 Drawing Sheets

METHOD FOR PRODUCING SUPERLONG CONJUGATED DIACETYLENE POLYMER

BACKGROUND OF THE INVENTION

This invention relates to a method for producing a superlong conjugated polymer.

A diacetylene derivative forms a single principal chain having a $\pi$-electron conjugated bond by a polymerization reaction in a solid phase, and forms a polymer of polydiacetylene. Since this polymer possesses electric conductivity and nonlinear optical effects, it is widely studied as an optical and electronic functional material.

Above all, when a diacetylene derivative possessing both hydrophobic group and hydrophilic groups is used, a monomolecular film can be formed on an surface of water, so that the build-up film may be fabricated by the Langmuir-Blodgett (LB) method. Recently, the method had high expectations as being one of the building-up means to develop molecular devices having the aforesaid desirable functions in the molecule itself. According to the LB method, a monomolecular film in the order of tens of angstroms can be produced, and its build-up film may be obtained easily.

Hence, much is studied about the process of polmerizing an LB film using a diacetylene derivative. More recently, it has been disclosed that the photoreactivity of diacetylene derivatives depends greatly on the arrangement of the diacetylene group. Since the role of the side chain group is important for molecular arrangement, photoreactivity is specifically studied on various diacetylene derivatives by replacing the side chain group.

On the other hand, since on many polydiacetylene derivative LB films, the color is changed dramatically from blue to red due to heat, pressure or ultraviolet rays, research is also intensive in studying the phase changes of such films.

However, much is unknown about the photoreactivity of diacetylene derivative LB films. Besides, nothing has been studied about the relationship between the molecular density or molecular arrangement and the photoreactivity in respect to the state of the monomolecular film. Still more, it has not yet been possible to produce straight-chain polydiacetylene of superhigh molecular weight having excellent electric conductivity, i.e. in the production of superlong carbon chains having continuous conjugated bonds.

Accordingly the present inventors, in examining a monomolecular film on the surface of water, i.e., a Langmuir (L) film, have developed a technique capable of optically measuring ultraviolet spectra and other properties at realtime while the $\pi$-A curve is monitored, in using such technique, the inventors examined the relationship between the photoreactivity and ultraviolet irradiation of a diacetylene derivative L film and the molecular density or molecular arrangement. Also, the inventors studied the photoreactivity of a diacetylene L film built-up at a typical molecular concentration, and discovered that photopolymerization of an LB film or that the crystals of a diacetylene derivative could produce a compound of only small molecular weight because the molecular area is significantly contracted at the time of polymerization. In other words, if the diacetylene derivative is photopolymerized in the state of an LB film or in the state of crystals, it is impossible to product a straight-chain diacetylene organic polymer which is continuous in respect to the conjugated bonds, as well as superhigh in molecular weight and excellent in conductivity.

On the basis of the above findings, the present inventors attempted to photopolymerize a diacetylene derivative while compressing the derivative at a constant surface pressure always in the state of a monomolecular film on the water surface that is, a Langmuir film (L film). As a result, the inventors finally succeeded in the production of polydiacetylene having continuous conjugated bonds, a straight chain, and which is superhigh in molecular weight (i.e., a superlong conjugated polymer). It has been furthermore discovered that a polydiacetylene of much longer conjugated bonds was obtained when a direct-current bias is applied in the direction of the water surface at the time of said photopolymerization.

SUMMARY OF THE INVENTION

This invention, therefore, presents a method for producing a superlong conjugated polymer comprising the steps of spreading an organic solvent containing a substance having a diacetylene group on an aqueous subphase and evaporating said organic solvent, gathering molecules of the substance having said diacetylene group remaining on the aqueous subphase in the parallel direction to the surface of the aqueous subphase, and polymerizing by light irradiation under a specified surface pressure. More preferably, while under a specified surface pressure, a direct-current electric field is applied in a direction parallel to said water surface, and then light irradiation is carried out to polymerize the monomolecular film. Further an inorganic salt may be present in the water.

That is, by photopolymerizing while applying a surface pressure on a L-film of the diacetylene derivative spread on the water surface, contraction of the molecular area at the time of photopolymerization is compensated, so that a polydiacetylene of superhigh molecular weight having continuous conjugated bonds and a straight chain can be produced. In other words, by compressing the diacetylene molecules arranged in a monomolecular state always under constant pressure, gaps produced in the molecular contraction at the time of photopolymerization are filled up to maintain a condition in which the photopolymerization reaction of diacetylene monomer proceeds continuously, so that a polydiacetylene of superhigh molecular weight having continuous conjugated bonds and a straight chain can be obtained. Moreover, by gathering the diacetylene derivative molecules on the water surface in the surface direction or by applying a direct-current bias in the surface direction at the time of photopolymerization, the arrangement of the monomer arrangement can be further improved, and a polydiacetylene having a longer conjugated bond is realized.

This invention provides various advantages, among which are as follows.

By the method of this invention, a polydiacetylene polymer which is excellent in conductivity can be prepared at a high efficiency. According to this method, theoretically, it is possible to prepare polydiacetylene of a superhigh molecular weight having a straight chain and a continuous length of a conjugated bond of tens of centimeters or even several meters. By optimizing the type of diacetylene derivative monomer or the manufacturing conditions according to the inventive method, it may also be possible to produce an organic superconductor without cooling.

While the novel features of the invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
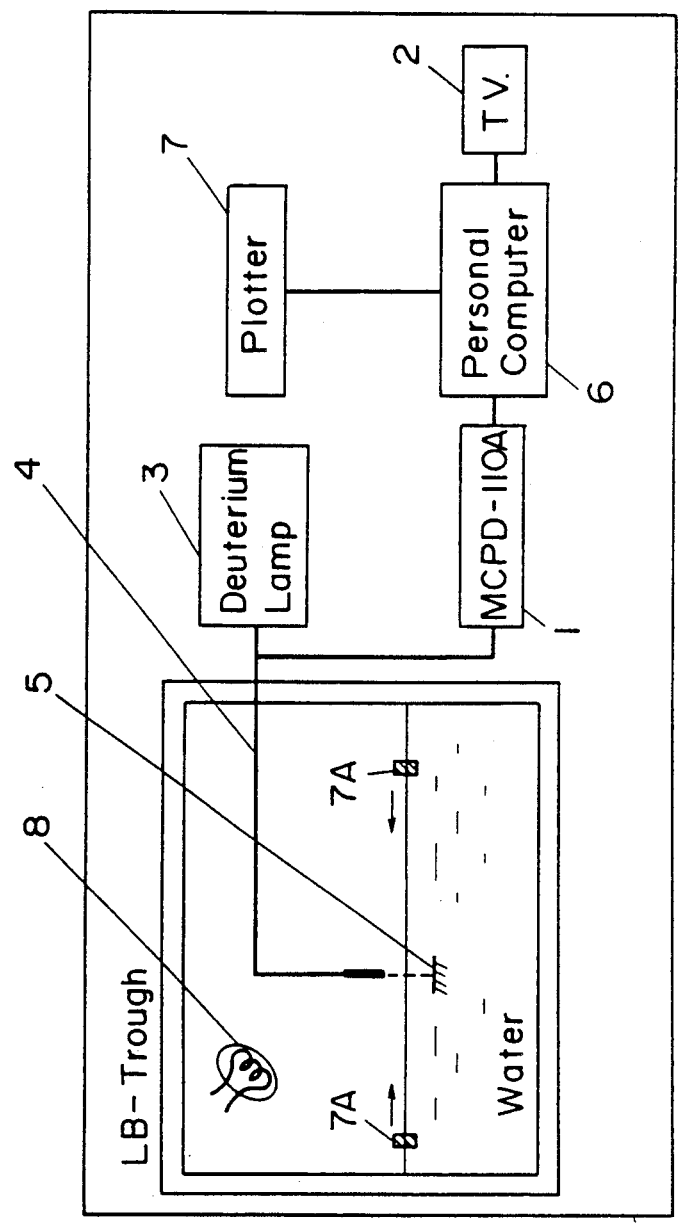
FIG. 1 is a conceptual drawing of a multichannel photometric system for evaluation of an L film used in the experiment of this invention.
Figure 2:
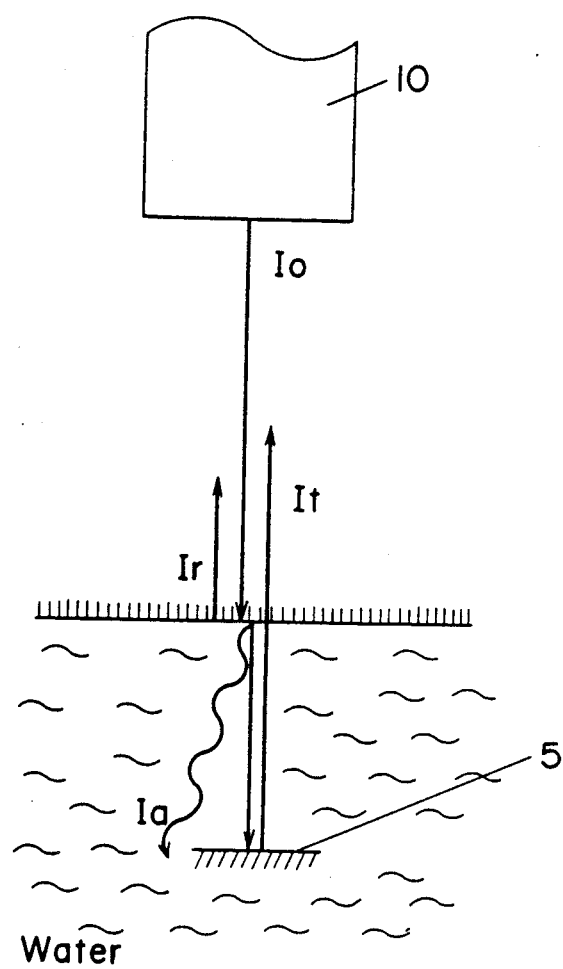
FIG. 2 is a conceptual drawing of an optical path near the L film sample.

First, the result of the experiment conducted as the preliminary step of invention is discussed. The sample used in this experiment is pentacosa dinoic acid $(CH_3(CH_2)_{11}-C\equiv C-C\equiv C-(CH_2)_8COOH$; PDA) which is a kind of diacetylene derivative. To begin with, in order to check the photoreactivity of PDA, the following experiment was conducted. For the evaluation of the photoreactivity of an L film and the build up of an LB film, a "Joyce Label Trough IV (FIG. 1A)" was used, and the experiment was conducted in a clean room of class 100 under yellow light, cutting off the light of 500 nm or less. At this time, the clean room was controlled to a temperature of $23\pm1°$ C. and humidity at $40\pm5\%$. An LB film of 25 layers was built-up, and as the build-up progressed, the build-up type was changed from a Z deposition to a Y deposition from around the tenth layer. The substrate used in building-up of the LB film was an Si substrate on which was deposited an oxide film of 3 inches in diameter before use. The light source used in the photoreaction and spectrum measurement is a deuterium lamp of 200 W, which is cooled in water in order to maintain stability. The intensity of illumination was always controlled at 0.05 mW/cm². For measurement of the photoreactivity on the L film, a new direct photometric system was developed by using a multichannel spectrophotometer 1 as shown in FIG. 1 (multichannel spectrophotometer MCPD-110A; Otsuka Electronics Co., Ltd.), by referring to a report by H. Gruninger et al. in J. Chem. Phys. 79(8), 3701-3710, Oct. 15, 1983. A main feature of this system is that the spectrum or light absorption intensity can be measured with realtime while monitoring the $\pi$-A curve of an L-film by a monitor TV 2. The UV light obtained from the deuterium lamp 3 is introduced from one end of a Y-shaped light guide (e.g., optical fiber) 4, and the light reflected and returning from a mirror 5 in the water is measured by the multichannel spectrophotometer 1, and is processed in a personal computer 6, and delivered through a plotter 7. FIG. 2 is a conceptual diagram of optical path near the L film. As shown in FIG. 2, the input light (Io) leaving the end 10 of optical fiber as the light guide 4 is divided into three sections at the interface of the L film and water surface, i.e., the light (Ia) absorbed by the monomolecular film, the light (Ir) reflected by the interface, and the light (It) transmitting through the interface and reflected and returned by the Al mirror. Actually, therefore, the light of Ir+It is measured, and by calculating the difference of Io and Ir+It at each wavelength, the absorption spectrum of the L film can be measured. Meanwhile, the L film on the water surface is designed to be compressed and pressurized in the direction of the water surface by means of barrier 7A. An ultraviolet light lamp 8 is used for photopolymerization of the L film.

Figure 3:
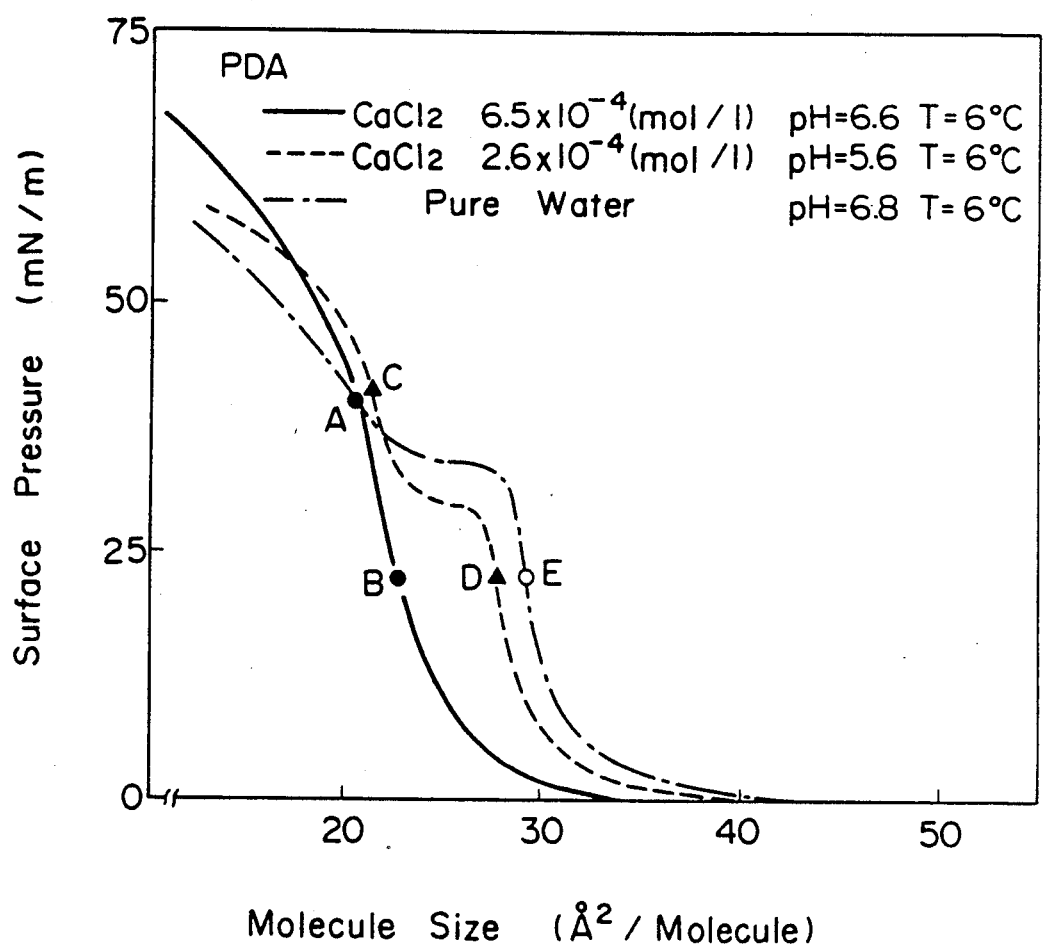
FIG. 3 is a diagram showing the $\pi$-A curve variation of a typical PDA-L film.
Figure 4:
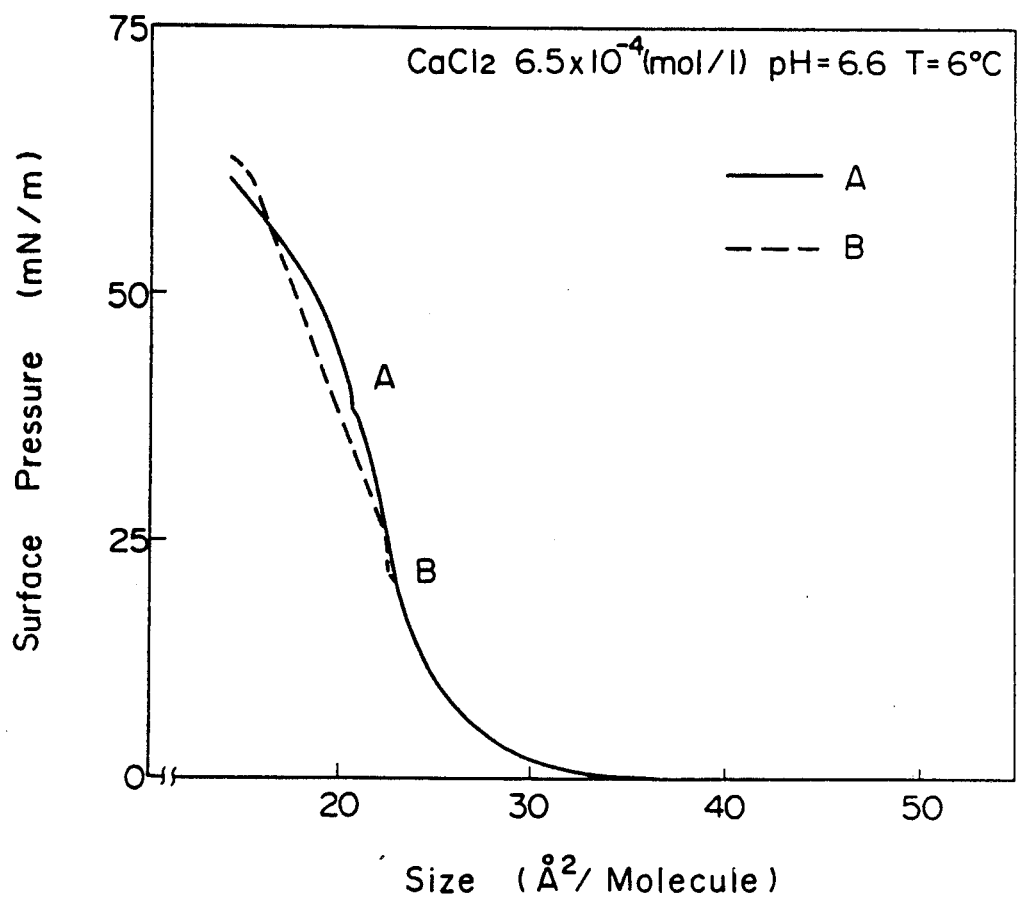
FIG. 4 is a diagram showing the $\pi$-A curve variation due to the light irradiation of a PDA-L film on the surface of high salt concentration water.
Figure 5:
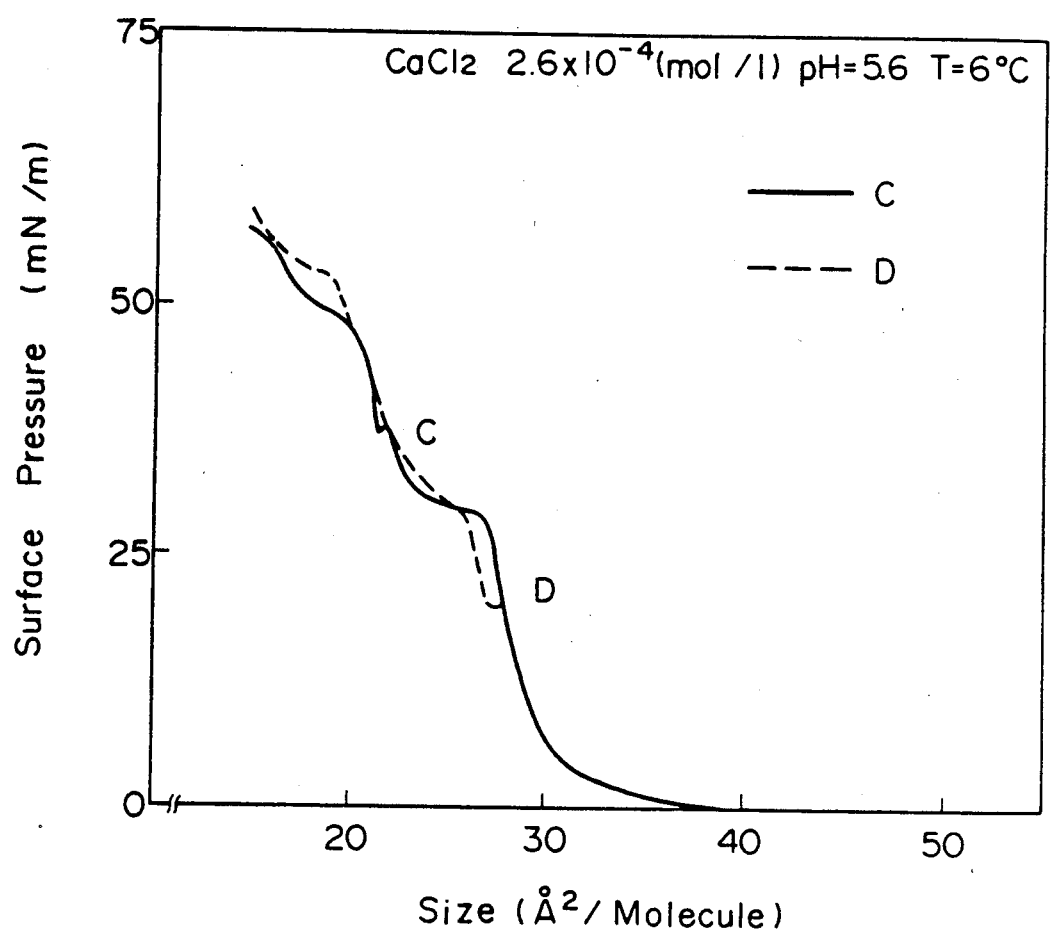
FIG. 5 is a diagram showing the $\pi$-A curve variation due to the light irradiation of a PDA-L film on the surface of low salt concentration water.
Figure 6:
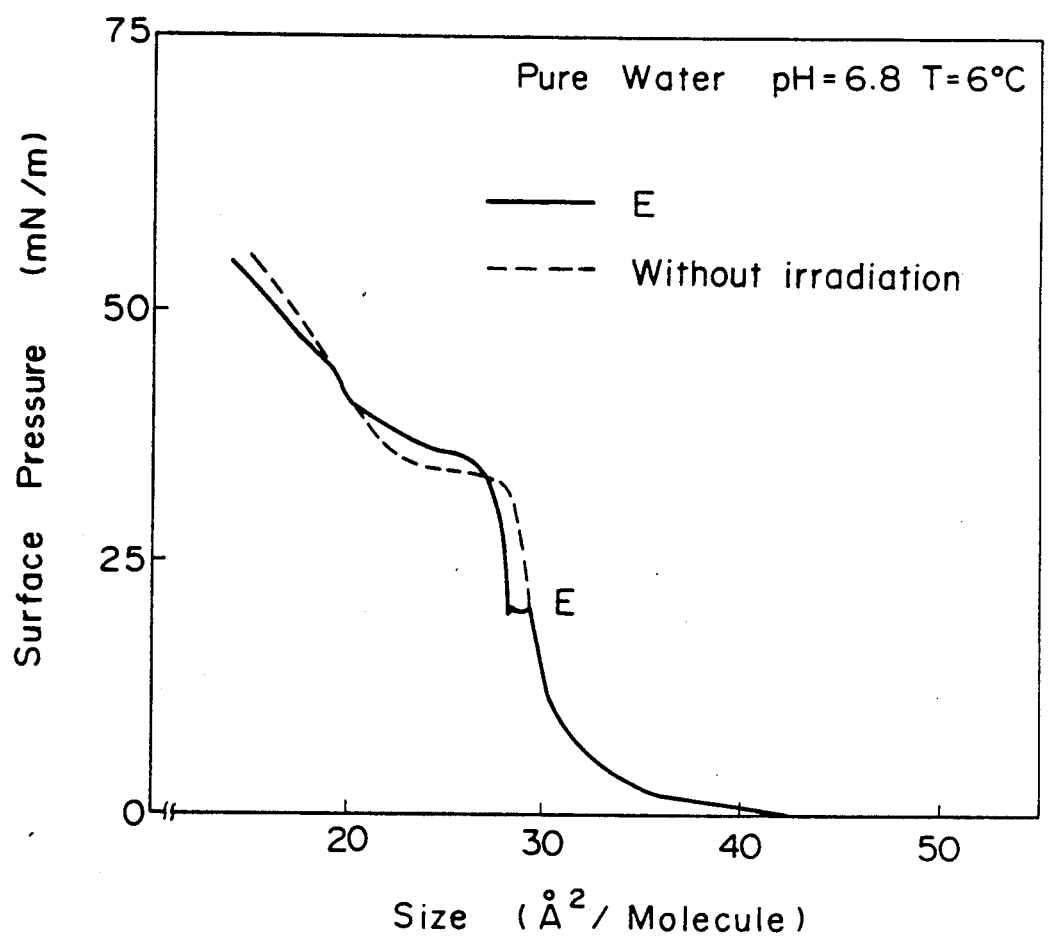
FIG. 6 is a diagram showing the $\pi$-A curve variation due to the light irradiation of a PDA-L film on the surface of pure water.
Figure 7:
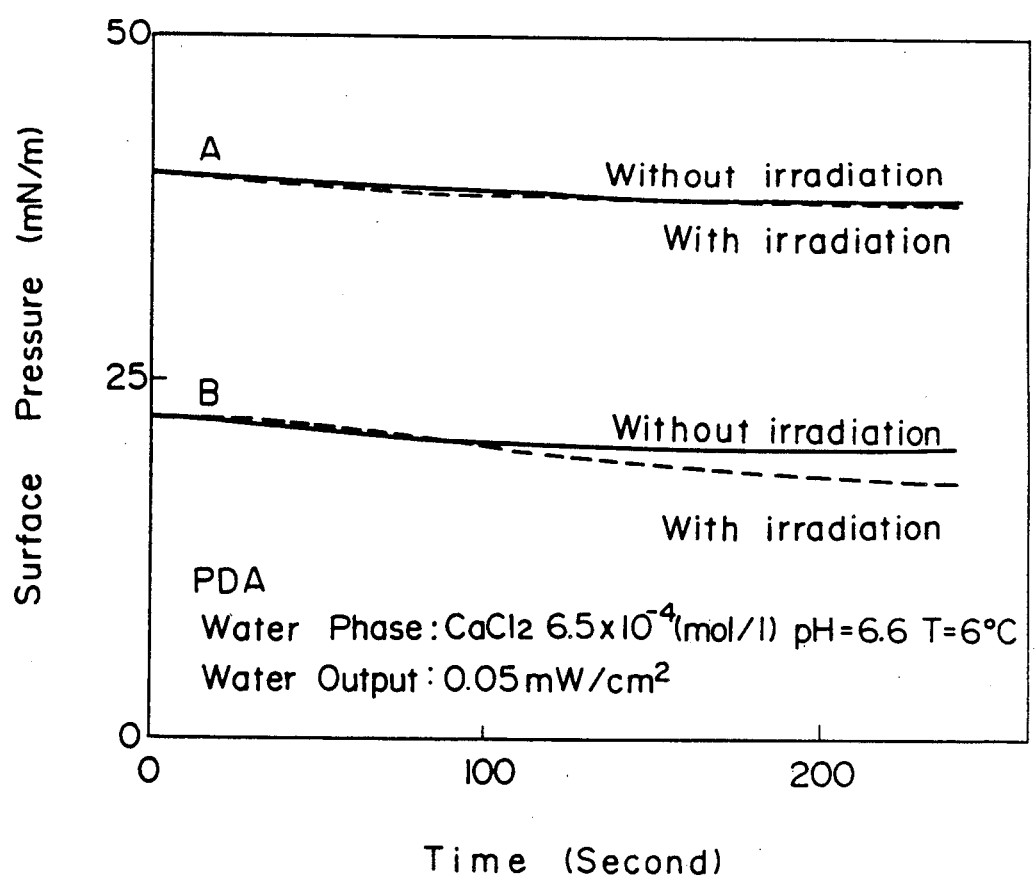
FIG. 7 is a diagram showing surface pressure variation due to light irradiation of a PDA-L film on the surface of high salt concentration water.
Figure 8:
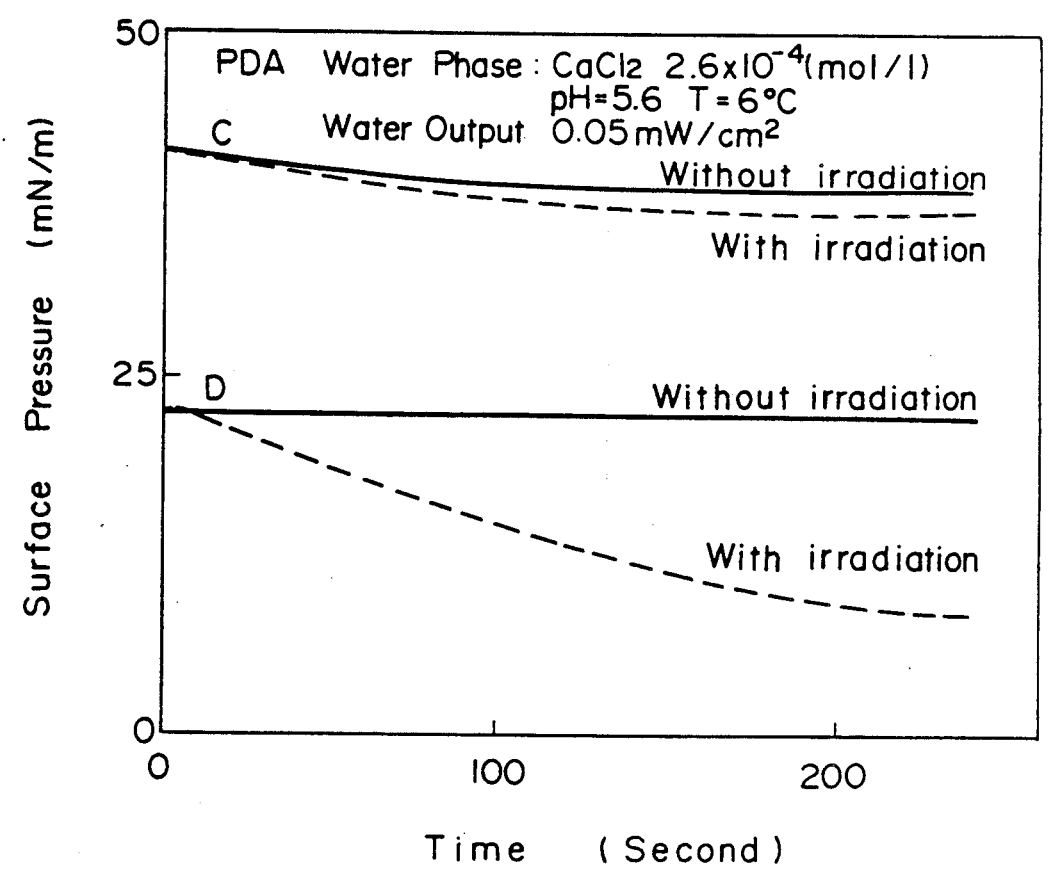
FIG. 8 is a diagram showing surface pressure variation due to light irradiation of a PDA-L film on the the surface of low salt concentration water.
Figure 9:
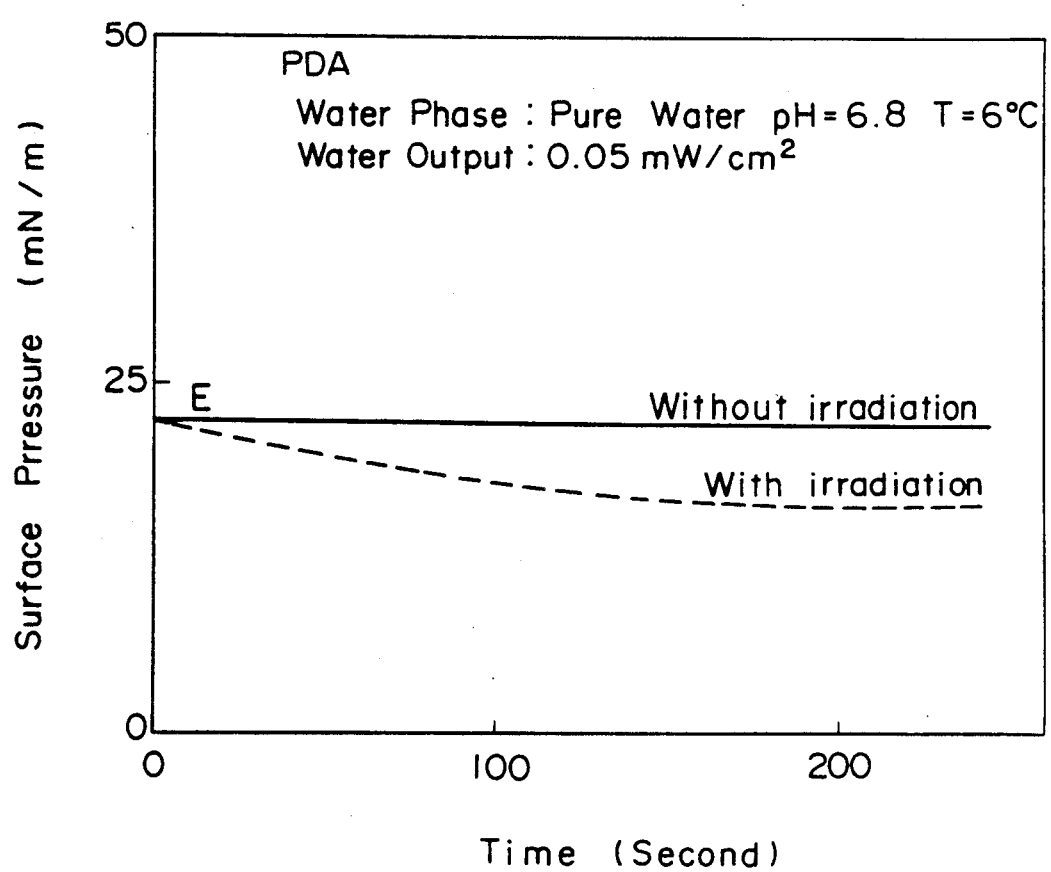
FIG. 9 is a diagram showing surface pressure variation due to light irradiation of a PDA-L film on the surface of pure water.
Figure 10:
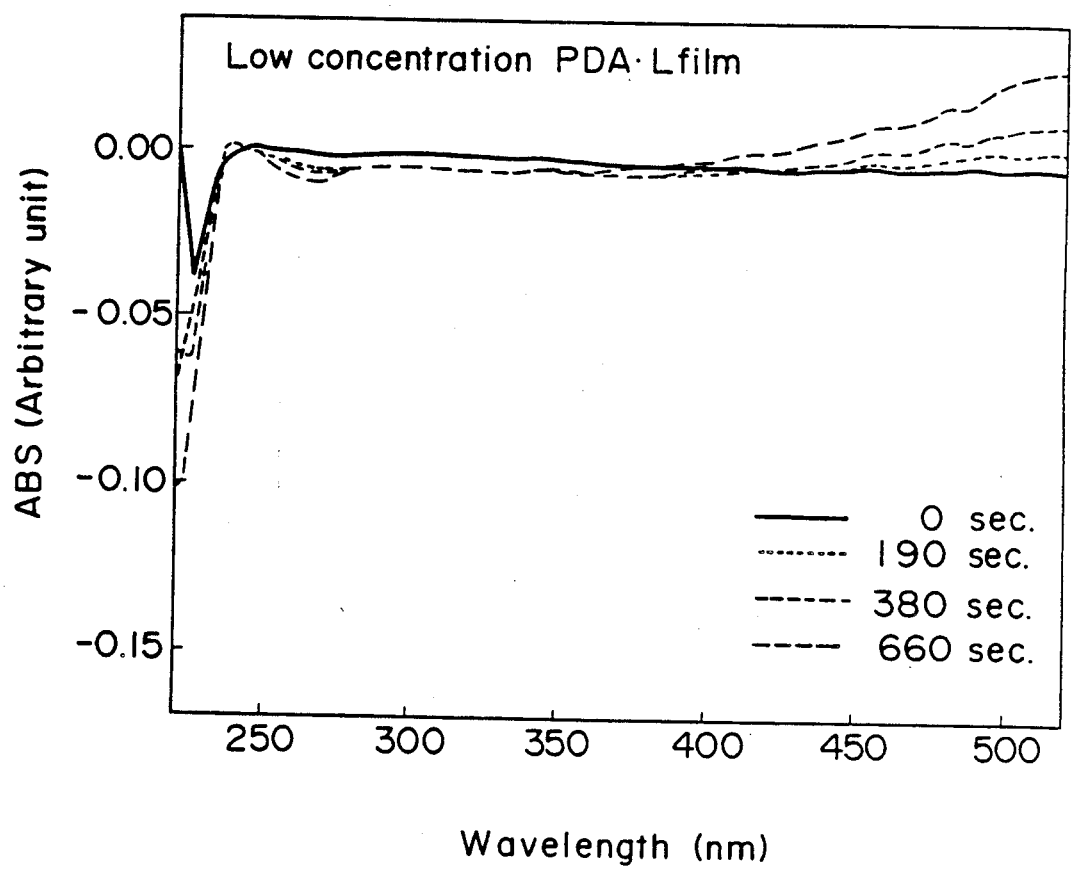
FIG. 10 is a diagram showing absorption spectrum variation due to UV irradiation of low concentration PDA-L film.

In order to find the effects of the differences in the molecular density and in the molecular arrangement on the photoreactivity of a PDA-L film, the π-A curve of the L film was measured by varying the salt concentration and pH of the aqueous subphase. Three typical π-A curves are shown in FIG. 3. Changes of the π-A curves when the PDA-L films in individual typical conditions (indicated by dots A, B, C, D, E in FIG. 3) were irradiated with ultraviolet light all over the surface for 5 minutes are shown in FIGS. 4, 5, and 6. In FIGS. 4 and 5, two π-A curves irradiated with ultraviolet light at points A and B, and points C and D overlap each other. In FIG. 6, the π-A curve irradiated with ultraviolet rays at point E and a π-A curve which has not been irradiated are overlapped. As shown in FIGS. 5 and 6, in a low concentration PDA-L film, the molecule area was significantly decreased by photopolymerization. Accordingly, in order to further clarify that the molecule size is decreased by photopolymerization, in individual conditions (indicated by dots A, B, C, D, E in FIG. 3), the barrier for compressing the PDA-L film was fixed, and the entire surface was irradiated with ultraviolet light. The changes of the surface pressure at this time are shown in FIGS. 7, 8, and 9. As shown in FIGS. 7 and 8, a great difference was recognized in the photoreactivity between the high concentration PDA-L film (point A) and the low concentration PDA-L film (point D). Meanwhile, between point D in FIG. 8 and point E in FIG. 9, a great difference was recognized in the change of the surface pressure, but at point D in FIG. 5 and point E in FIG. 6 a similar contraction of the molecule area was observed. This difference seems to be due to the fact that the PDA-L film was destroyed in the photopolymerization process because the aqueous subphase of the PDA-L film in FIG. 6 is pure water.

Figure 11:
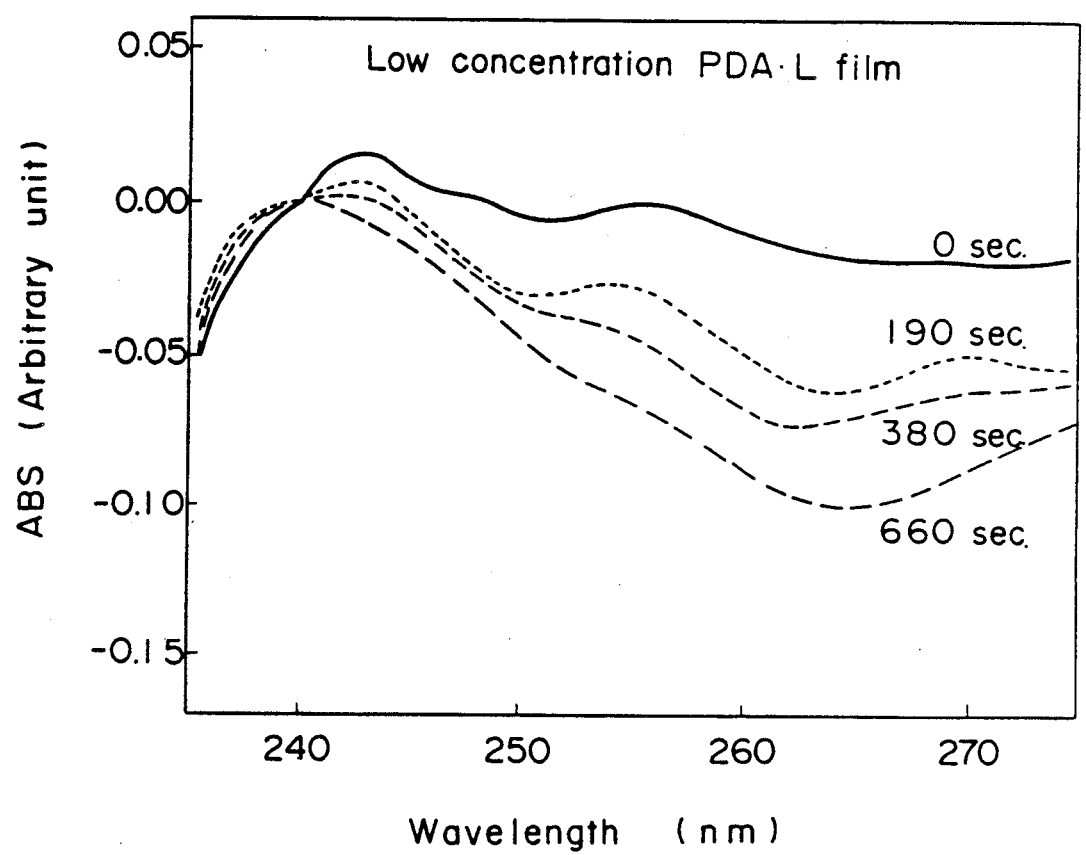
FIG. 11 is a diagram showing the absorption spectrum variation due to the UV irradiation of a low concentration PDA-L film.
Figure 12:
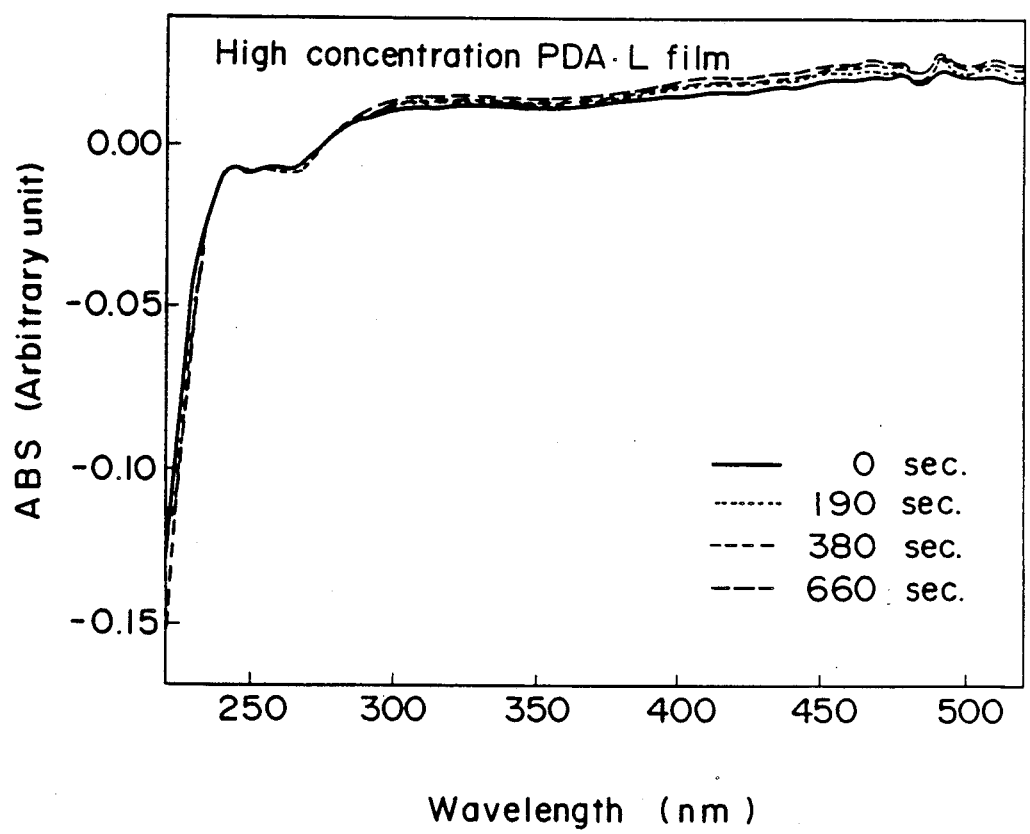
FIG. 12 is a diagram showing the absorption spectrum variation due to the UV irradiation of a high concentration PDA-L film.
Figure 13:
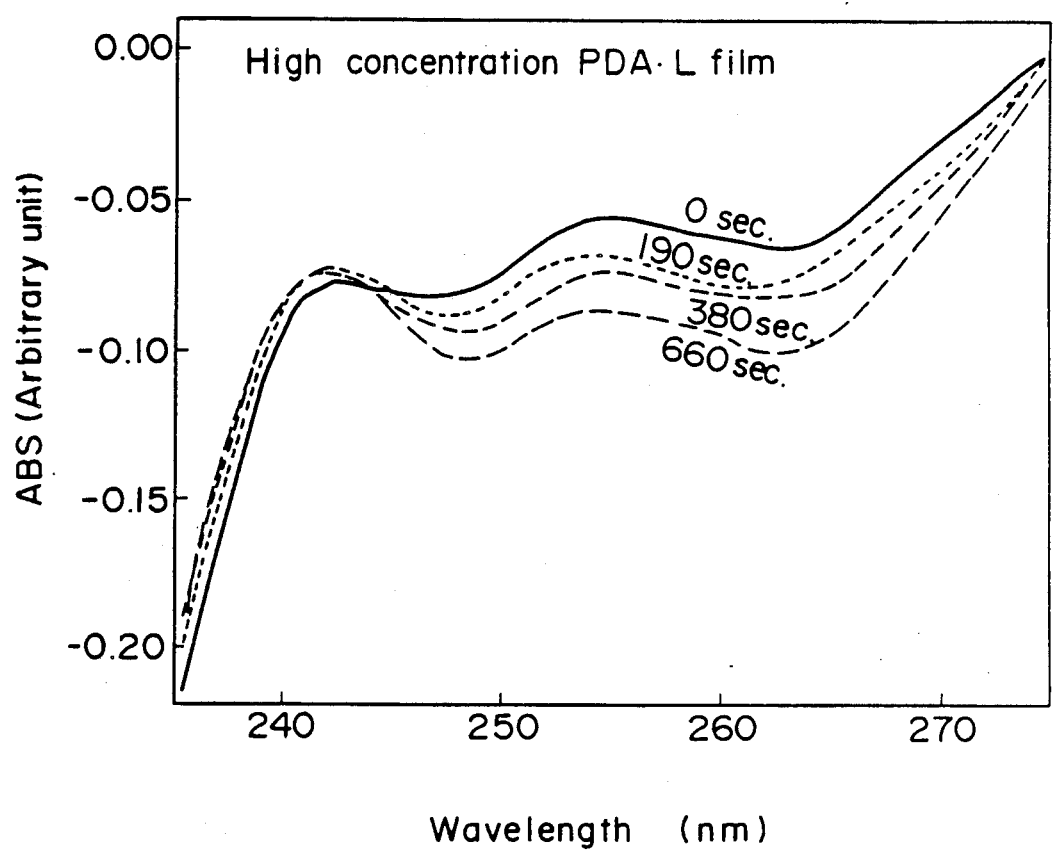
FIG. 13 is a diagram showing the absorption spectrum variation due to UV irradiation of high concentration PDA-L film.

Furthermore, at two typical points (A, D), the spectrum changes of the PDA-L film due to ultraviolet irradiation are shown in FIGS. 10, 11, 12, and 13. These spectra show the changes in the absorption spectra due to the photoreaction of the monomolecular film on the water surface. FIGS. 11 and 13 are partially magnified views of FIGS. 10 and 12, and in both diagrams, the absorption peaks are noted at 242 and 255 nm. As shown in FIG. 11, in the low density PDA-L film, the two absorption peaks are extinguished along with the ultraviolet irradiation. These absorptions, meanwhile, coincide very well with the action spectrum reported by B. Tieke et al. in Chemistry Edition, vol. 17, 1631-1644, 1979. By contrast, in the high density PDA-L film as shown in FIG. 13, even in the same irradiation condition, there is almost no change in the absorption band peak. The difference in the photopolymerization in these two PDA-L films can be further confirmed in FIGS. 10 and 12. That is, in the low density PDA-L film (FIG. 10), a new absorption appears at 400 nm or over along with the ultraviolet irradiation, but it is not recognized at all in the high density PDA-L film. Generally, the absorption of the visible light region of 400 nm or over is said to be due to the absorption of polydiacetylene or polybutatriene, but in the high density L film, this absorption is not observed at all, if irradiated with ultraviolet light. Therefore, it is estimated that the polymerization of the PDA-L film is not generated at all. It is obvious from the π-A curve shown in FIG. 3 that the cause of such difference in the photoreactivity consists in the difference in the molecular density or molecular arrangement on each surface pressure. In other words, if the arrangement of the molecules of the PDA-L film is different, the same ultraviolet irradiation condition may not always contribute to the photopolymerization reaction of the PDA-L film.

Figure 14:
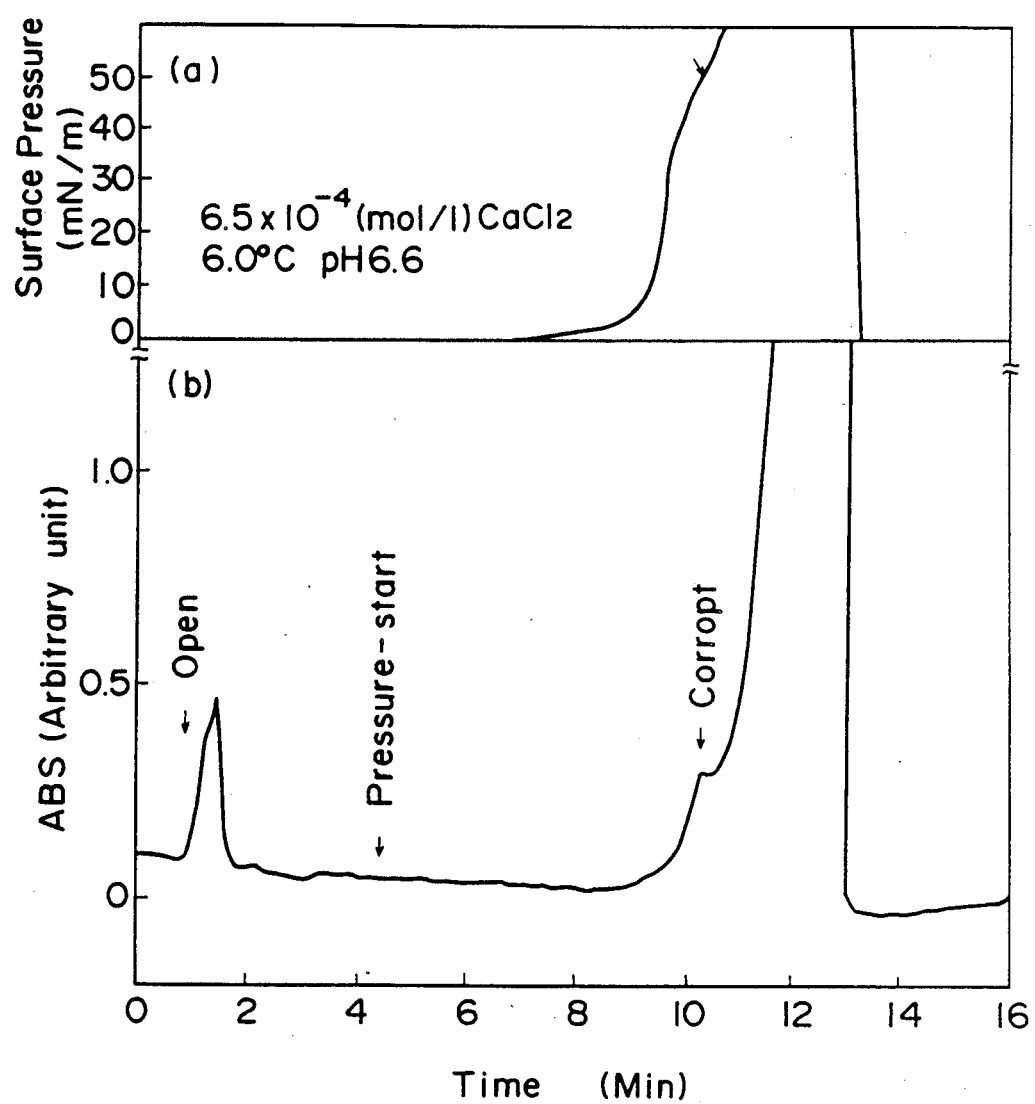
FIGS. 14A, B are diagrams showing changes in the surface pressure and absorption strength due to the barrier movement of the PDA-L film on the surface of high salt concentration water [FIG. 14A showing surface pressure variation due to barrier movement.
FIG. 14B showing the absorption strength variation at 242 nm due to barrier movement]
Figure 15:
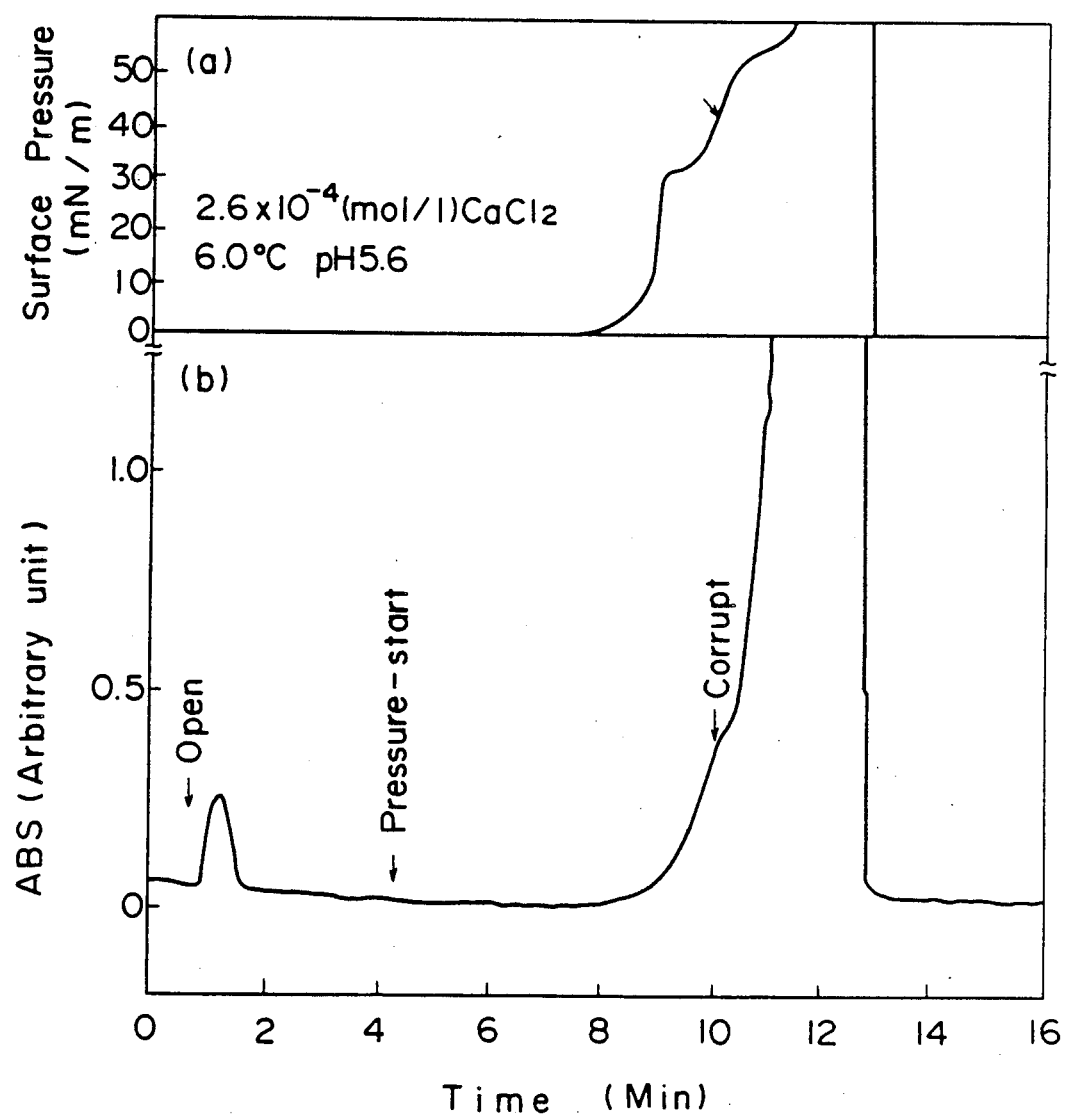
FIGS. 15A, B are diagrams showing changes in the surface pressure and absorption strength due to the barrier movement of the PDA-L film on the surface of low salt concentration water [FIG. 15A showing the surface pressure variation due to barrier movement, FIG. 15B showing the absorption strength variation at 242 nm due to the barrier movement]

On the other hand, as shown in FIGS. 3, 7, and 8, even in the same high density state, a slight difference in the photoreactivity was recognized between point A and C. Accordingly, in order to clearly distinguish the phase condition of the L film, in particular the collapse region, changes of the light absorption intensity of the PDA-L film were measured, simultaneously with the π-A curve measurement on the water surface, by fixing the wavelength at 242 nm. Although it was not possible to clearly distinguish by the π-A curve alone, the collapse region can be clearly discriminated from the steep change in the light absorption intensity according to FIGS. 14 and 15. Checking the difference between point A and point C in FIGS. 14 and 15, a perfect solid film state was recognized at point A, while the boundary region of the solid film region and the collapse region was recognized at point C. That is, the disturbance of the molecular arrangement occurring at point C in the PDA-L film seems to be the cause of a slight photoreaction in spite of the high concentration region.

Figure 16:
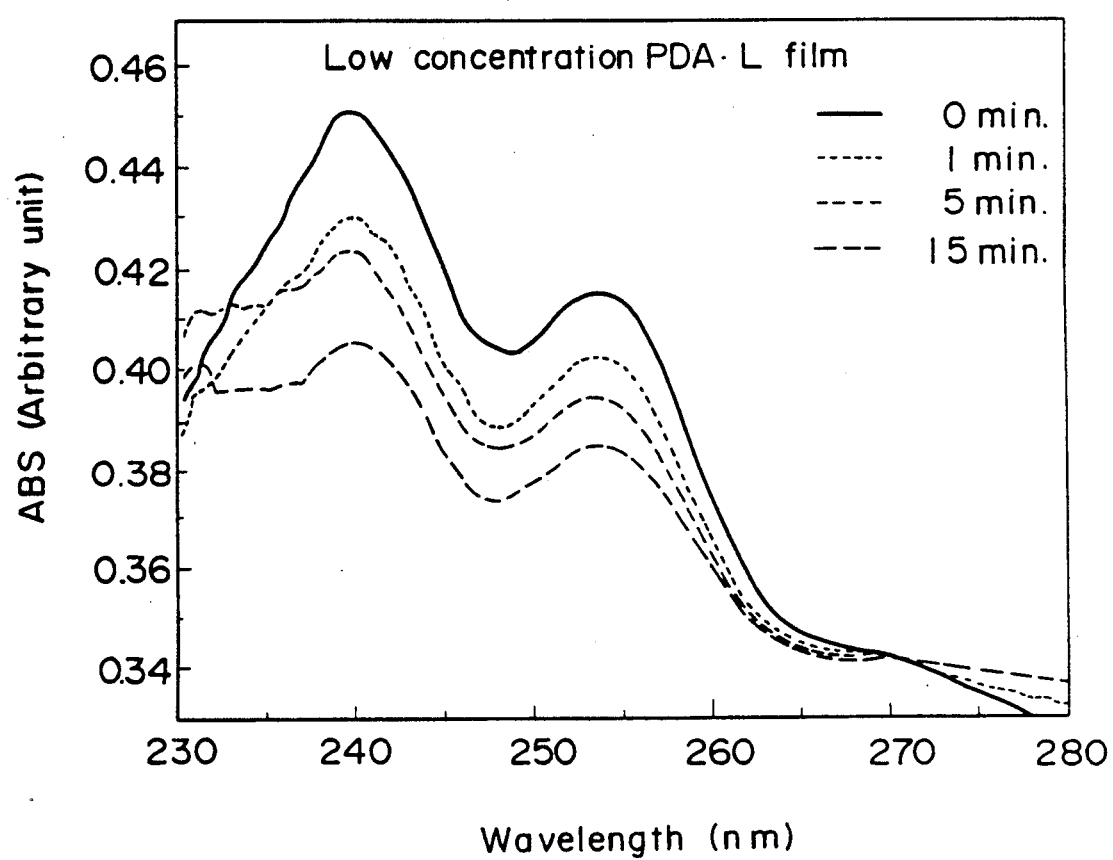
FIG. 16 is a diagram showing the absorption spectrum variation due to the UV irradiation of a low concentration PDA-L film.
Figure 17:
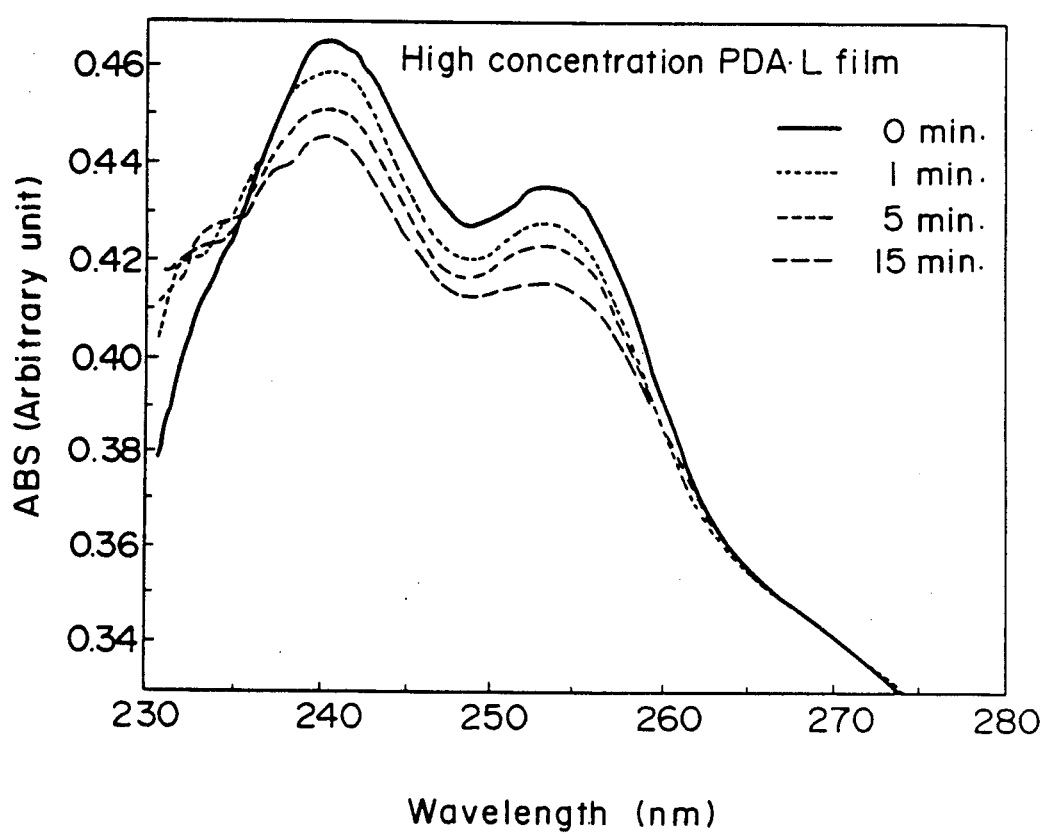
FIG. 17 is a diagram showing the absorption spectrum variation due to the UV irradiation of a high concentration PDA-LB film.

Moreover, in order to see whether the photoreactivity of the L film was maintained in the LB film, the photoreactivity of the PDA-LB film accumulated at typical points A, D was investigated. FIG. 16 shows the spectra changes due to UV irradiation of the low density PDA-LB film built-up at point D in FIG. 3, and FIG. 17 shows the spectra changes due to UV irradiation of PDA-LB film built-up at point A in FIG. 17. These absorptions also coincide with the action spectrum reported by B. Tieke et al. (op. cit.). Though slight changes are noted in FIG. 17, in FIG. 16 a sudden drop of absorption is observed in the first 1 minute. Therefore, as clear from a comparison between FIGS. 16 and 17, and FIGS. 11 and 13, it is evident that the molecular arrangement and molecular density of the PDA-L film at the time of building-up are maintained nearly even in the PDA-LB film. Incidentally, in the high density PDA-LB film (FIG. 17), the photoreaction is somewhat promoted, which seems to be the result of disturbance in the arrangement at the time of building-up of the LB film.

Figure 18:
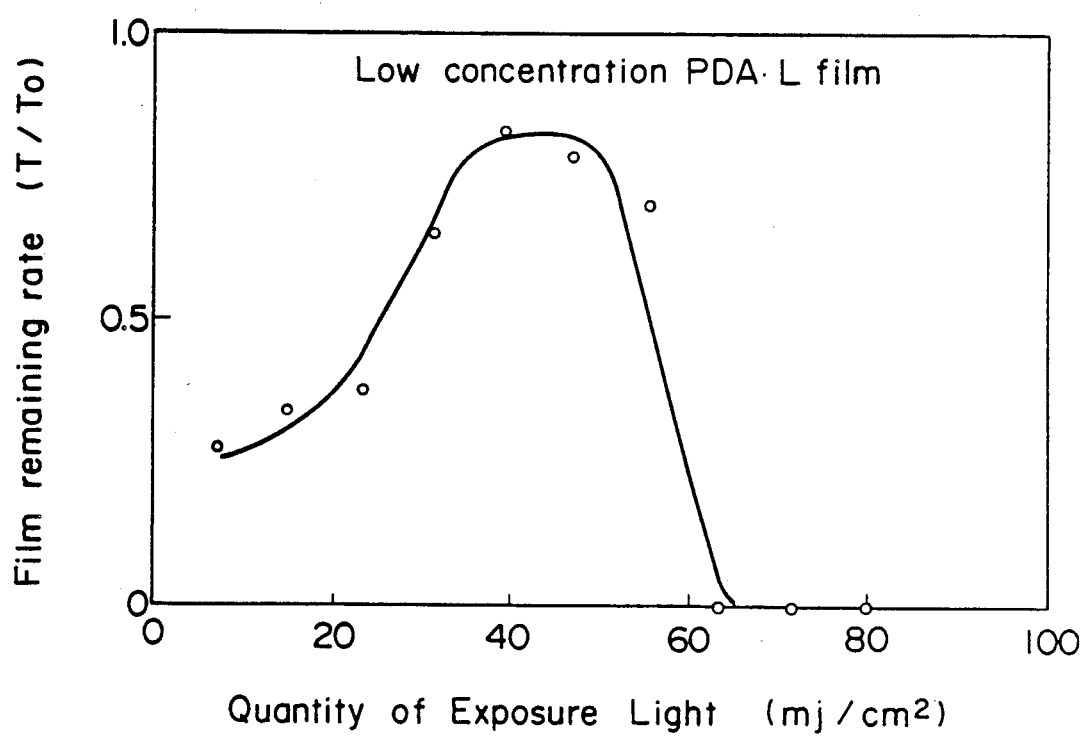
FIG. 18 is a diagram showing the residual film rate variation due to the ultraviolet ray irradiation of a low concentration PDA-LB film.

Furthermore, in the low density PDA-LB film, samples exposed to different quantities of light were dipped in ethanol, and were dissolved, and the normalized residual thickness of film was plotted, as shown in FIG. 18. This is the result of dipping in ethanol after irradiating the PDA-LB film of 50 layers with ultraviolet rays. The normalized residual thickness of the PDA-LB film built-up at point D increased at 40 to 50 mJ/cm$^2$, and decreased as the irradiation increased. It is hence predicted that the PDA-LB film of low molecular density would be polymerized by ultraviolet irradiation, while the polymerized poly-PDA-film would be photodecomposed. On the other hand, the PDA-LB film built-up at point A did not remain on all of the exposed samples. Therefore, in spite of irradiation with ultraviolet rays, almost no polymerization was noted.

Figure 19A:
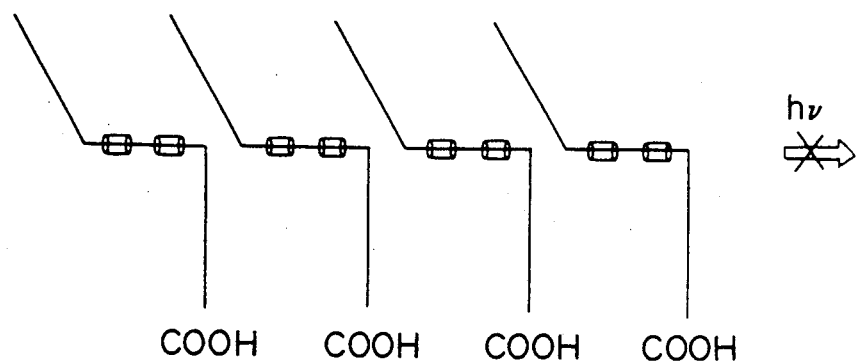
FIG. 19A to FIG. 19C are explanatory diagrams showing the arrangement models of a PDA-L film free from photoreaction.
Figure 19B:
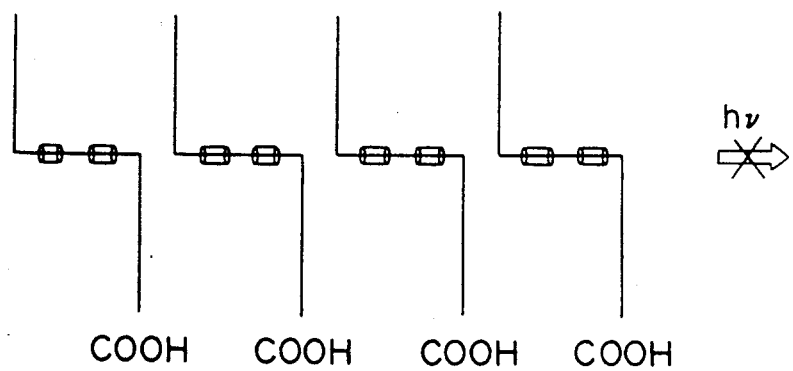
Figure 19C:
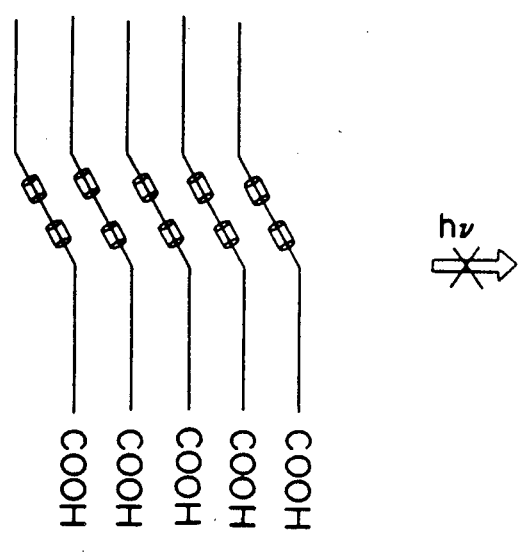
Figure 20A:
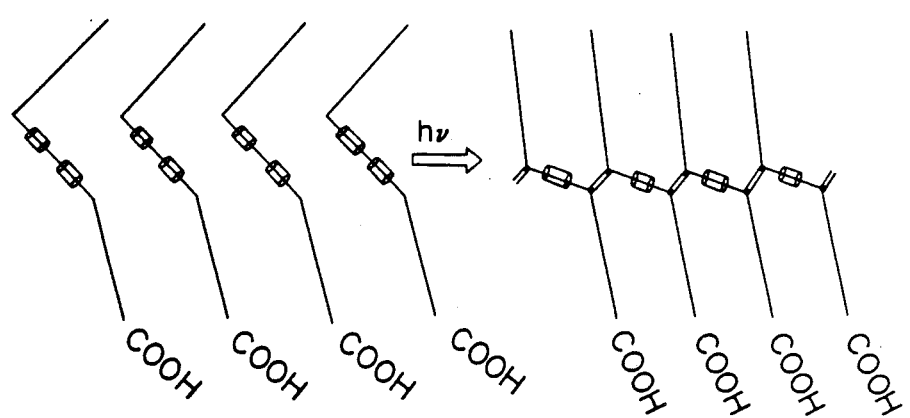
FIGS. 20A, B are diagrams showing the photoreaction of a low concentration PDA-L film [FIG. 20A showing the utltraviolet ray polymerization process of a PDA-L film, and FIG. 20B showing the ultraviolet ray decomposition process of poly-PDA-L film].
Figure 20B:
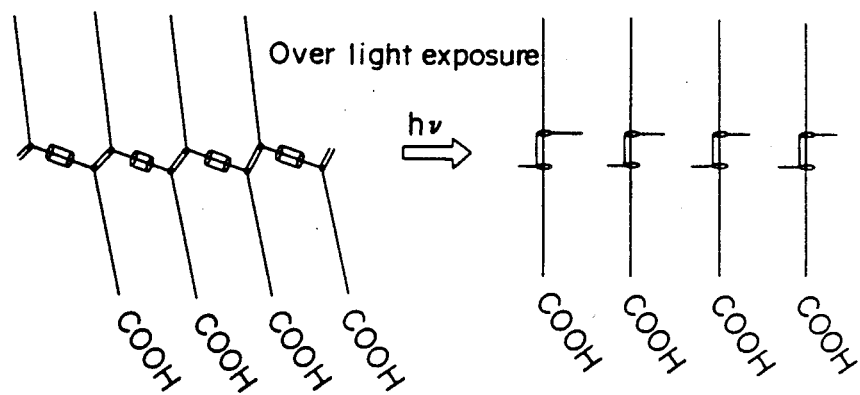

The above result proves that the PDA-L film produces a polydiacetylene bond to polymerize, not in the photoreaction process as shown in FIGS. 19A, B, and C, but in the reaction process as shown in FIG. 2, that is, at low molecular density. However, the polydiacetylene bond produced in the photopolymerization reaction process is not so active as in the polymerization process, but is unstable. This fact is further proven by the fact that the normalized residual thickness becomes zero by excessive light irradiation (FIG. 18). In other words, the polydiacetylene bond formed by polymerization is promoted in decomposition if irradiated with light after being polymerized. Incidentally, the photo-decomposition reaction of poly-PDA-L film and LB film is not yet disclosed, but decomposition at the triple bond may occur as shown in FIG. 20.

That is, the photoreaction of the PDA-L film depends greatly on the molecular arrangement or density of the PDA molecules. In the high density PDA-L film, the photoreactivity is low, while in the low density PDA-L film it has been confirmed that the photoreactivity is high. However, when the low density state L film was irradiated with light, a very large reduction of the molecular size was noted. These phenomena were similarly confirmed in the LB film.

Therefore, in the LB film, since the molecule weight is reduced as the photopolymerization proceeds, and the polymerization is interrupted, it is impossible to produce a polydiacetylene of superhigh molecular weight. All these results indicate that photopolymerization is induced among the PDA molecules by UV irradiation only when the molecular spacing of the PDA molecules is kept at a proper distance, so that polydiacetylene bonds are formed. It has been also confirmed that the polydiacetylene bond, once formed, is decomposed if irradiated excessively with light.

On the basis of the above results, one of the embodiments of this invention is described below. Using the trough IV (FIG. 1) used in the above experiment, a PDA-L film was formed on the surface of an aqueous solution whose condition was set at a salt concentration $2.6 \times 10^{-4}$ and a pH of 5.6, where a low density PDA-L film is formed. That is, the organic solvent containing PDA (chloroform) was spread and evaporated, and the PDA-L film remaining on the subphase was gathered by the barrier 7 in the direction of the water surface. And then, photopolymerization carried out for about 5 minutes by using an ultraviolet lamp 8 of 0.05 mW/cm$^2$ while applying a surface pressure of 20 (mN/m), whereby a polydiacetylene of superhigh molecular weight having continuous conjugated bond and straight chain was successfully prepared. This was achieved by compensating for the reduction of the molecule area at the time of photopolymerization, that is, the preventing breakage of the polymer due to the decrease of the molecular area at the time of photopolymerization. The polymer thus obtained has a high conductivity. It has also been conformed that a polydiacetylene having longer conjugate bond lengths will be obtained by applying a direct-current bias of scores of volts in the direction of the water surface, when the diacetylene derivative molecules on the water surface gathered in the surface direction, or because better molecular arrangement can be achieved, when carrying out the photopolymerization. In this case, it is better to apply an electric field by attaching an electrode directly to the barrier, or it may be also possible to apply voltage in a direction perpendicular to the barrier moving direction.

While the specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

We claim:

1. A method for producing a polydiacetylene type superlong conjugated polymer monolayer comprising the steps of:

spreading an organic solvent containing a substance having a diacetylene group on an aqueous subphase and evaporating said organic solvent;

gathering molecules of the substance having said diacetylene group remaining on the aqueous subphase to form a monolayer of the substance by a barrier in the parallel direction to the surface of the aqueous subphase;

polymerizing said monolayer of the substance on said aqueous subphase by UV light irradiation under a surface pressure of about 20 mN/m to produce said polydiacetylene type conjugated polymer monolayer before build up; and building up the polymerized polydiacetylene type conjugated polymer monolayer on said substrate.

2. A method for producing superlong conjugated polymer according to claim 1, wherein polymerization is conducted by light irradiation while applying a direct-current electric field in the parallel direction to said surface of the aqueous subphase under a specified surface pressure.

3. A method for producing superlong conjugated polymer according to claim 1, wherein an inorganic salt is contained in the aqueous subphase.

4. A method for producing a superlong conjugated polymer according to claim 1, wherein the product is transferred onto a substrate after being polymerized.

* * * * *